Patented Oct. 14, 1947

2,428,813

UNITED STATES PATENT OFFICE 2,428,813

SUGAR CANE WAX EXTRACTION

Fred H. Rhodes and Oscar J. Swenson,
Ithaca, N. Y.

No Drawing. Application August 10, 1943,
Serial No. 498,099

12 Claims. (Cl. 260—412.5)

This invention relates to a method for obtention of a wax. More particularly, it pertains to extraction of wax from a sugar mill residue, and includes correlated improvements and discoveries whereby recovery of wax from such residues may be enhanced.

All varieties of sugar cane carry a greater or lesser amount of wax. This wax is present on the outer surface of the stalk in a layer of varying thickness, but more especially at the joints thereof. Various methods have been suggested for separating this wax, as by scraping the stalk with a sharp instrument, and by passing the stalks through a bath of water heated sufficiently to melt the wax prior to pressing. These procedures, however, have proved to be impractical.

An object of the invention is the provision of a method which leads to obtention of wax naturally occuring upon sugar cane.

A further object of the invention is to provide a method whereby wax present in a sugar mill residue may be separated therefrom and in a manner that may be readily, effectively and economically practiced commercially.

A more particular object of the invention is the provision of a procedure in accordance with which wax may be removed from a sugar mill residue by means of a water immiscible solvent therefor.

A specific object of the invention is to provide a method which leads to production of wax present on sugar cane by treating the residue resulting from purification of extracted sugar juices, and known as cachaza, by which term it will be referred to throughout the specification and claims, with a solvent for said wax, e. g., a liquid petroleum distillation fraction.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

Extraction of sugar juice from sugar cane is effected by cutting the cane into three or four foot lengths, and feeding these into crusher rolls. These rolls express the juice and the pressed cane is macerated with water, as a wash water, and repressed. This may be repeated several times and affords a practically complete recovery of the sugar content. The thoroughly crushed cane, composed almost wholly of woody matter and water, is known as "bagasse," which may be utilized as fuel, or disposed of in other manners. The cane juice, including that from the repeated pressings, is treated with slaked lime or other suitable substance, and heated to a temperature which may be from about 212 to 220° F., whereby precipitation of impurities, as certain phosphate compounds and proteins, is brought about. The thus treated juice may then be permitted to stand, whereupon the impurities settle, or it may be passed immediately to a suitable means for filtering. In either event a residue is obtained containing these certain phosphates, coagulated protein and other substances, including the wax which was removed from the sugar cane during the pressing operations. This residue varies somewhat in consistency and texture, and usually is in the form of a semi-solid or mud. It is this residue which is known as cachaza, as above mentioned. The wax present in the cachaza differs in composition according to the variety of sugar cane and method of isolation, and may contain varying percentages of relatively hard and soft fractions. The term "wax," as used throughout the specification and claims, refers to a crude wax, including hard and soft fractions.

In the practice of the invention cachaza obtained as above set forth and having a water content from about 60 to about 85% is treated with a water-immiscible organic solvent for the wax, followed by separation of wax-laden solvent and treated cachaza; and recovery of wax from the separated solvent, as by distillation. Additionally, the solvent retained by the treated cachaza may be recovered therefrom. It was found that with cachaza, having a water content of less than 60%, a thorough mixing thereof with solvent was difficult, which led to incompleteness in wax extraction. It was also found that when the cachaza contained more than 85% water, the solvent formed an emulsion, from which the solvent layer separated incompletely and very slowly. However, with a water content of between 60 and 85% an effective extraction of wax is brought about while avoiding retention of large amounts of the solvent in the extracted cachaza.

Extraction of wax from cachaza of proper water content may be brought about through the utilization of various solvents, as liquid hydrocarbons, more particularly aliphatic hydrocarbons, and especially a liquid petroleum fraction distilling completely at a temperature of about 230° F. As solvents, utilization may be made of benzene, toluene, xylenes, hexanes, heptanes, octanes, nonanes, singly or in compatible admixture, saturated cyclic hydrocarbons, as cyclohexane, and chlorinated hydrocarbons, as for example, carbon tetrachloride and acetylene tetrachloride. Moreover, the solvent employed should be characterized by having a relatively high solvent power for the wax, and should be of limited solubility in water, preferably substantially immiscible therewith.

The temperature at which the extraction may suitably be carried out is upwards of about 60° F., and that temperature which is the boiling point of the mixture of solvent and cachaza of proper water content at the pressure under which the cachaza is extracted may be considered as the maximum. Desirably, the temperature should not exceed the boiling point of the cachaza and solvent at atmospheric pressure, and suitably not lower than 20° below such boiling point. Should a temperature above the boiling point at atmospheric pressure be employed, it would then be necessary to operate at a pressure higher than atmospheric, and when the temperature is lower than 20° below such boiling point, the extraction is slower and relatively incomplete.

As solvents toluene and a petroleum fraction distilling completely below about 300° F. are preferred, and the term "toluene" includes pure and commercial toluene. The commercial may contain, among others, especially benzene and xylene. The ratio of solvent to dry material may be from 0.5 lb. to 20 lbs., and markedly satisfactory results obtain when a ratio of from 2 to 6 lbs. of solvent per lb. of dry material is employed. Further, the extraction of wax may be conducted in accordance with the countercurrent principle, and in a continuous manner, with the wax-laden solvent being removed after contacting with fresh cachaza and the treated cachaza being discharged following contact with fresh solvent. The solvent content of treated cachaza is recovered and may be re-used.

As above indicated, if the water content of the cachaza is too low, the extraction takes place slowly and incompletely, whereas if it is too high an emulsion is formed and solvent can then be separated from the cachaza with difficulty, or only very incompletely. Additionally, should the water content be too low, the mechanical handling of the cachaza or mud becomes difficult due to the formation of lumps, occasioned by the stickiness of the material. However, admixture of a proper amount of water leads to the formation of a smooth body which admixes readily with solvent without difficulty. It was found that cachaza undergoing treatment should contain not less than 60 and not more than 85% of water. Preferably, the extraction should be conducted with from 75 to 80% of water, and suitably about 77%. The water content suitably should be somewhat less than that at which the solvent readily forms an emulsion with the water-cachaza mixture as an upper limit, and at least that which forms a non-agglomerating paste with the cachaza as a lower limit.

Moreover, certain other preferred conditions are: a solvent-cachaza dry material ratio of about 3:1; a temperature between the boiling point of the solvent and cachaza at atmospheric pressure and 10° F. below such boiling point; and utilization of commercial toluene or a commercial petroleum fraction, as a heptane fraction distilling over completely between 190° F. and 230° F.

As illustrative of a manner in which the invention may be practiced, the following description is presented.

A cachaza, or cake, as one coming from filter presses, is admixed with water in an amount sufficient to give a water content of about 77%. During the admixture the mass may be heated to a temperature of approximately 170° F. and thereupon it is treated, i. e., subjected to extraction, in a continuous countercurrent manner, with a commercial heptane, as one distilling completely at a temperature of about 230° F. The amount of heptane contacting with the cachaza is about 5 lbs. per lb. of dry material, and the temperature attending the extraction is about 170° F. Operating according to countercurrent principle, the concentrated extract or wax-laden solvent is removed continuously after contacting fresh cachaza, and the treated cachaza is removed continuously after contacting fresh solvent. The wax-laden solvent is then subjected to evaporation for removal of the solvent, and the treated or extracted cachaza may be admixed with a further quantity of water to form a slurry and then passed through a distilling column wherein the solvent carried is recovered by distillation.

The removal of solvent from the treated cachaza may be effected in various manners, of which attention may be directed to the following: heating to cause boiling of the water and solvent content with accompanying evolution thereof; blowing steam therethrough whereby solvent is vaporized; subjecting the treated cachaza to vacuum as it is discharged, which occasions flash of solvent and water, with the heat of vaporization being supplied by the sensible heat of the cachaza; admixture of the cachaza with water to form a slurry with introduction thereof into a distilling column wherein solvent is removed by the steam passing upwardly and countercurrently to descending slurry, with utilization of reduced pressure, if desired, and combinations of the foregoing. The evolved solvent and water vapor are condensed and the one separated from the other by gravity. The solvent forms the upper layer and may be returned to the process for further extracting, and the water may also be returned to form the slurry. Such procedure minimizes the possibility of solvent loss.

The wax-laden solvent obtained in the extraction may be concentrated and solvent removed therefrom by evaporation. It has been found that removal of all of the solvent cannot be effected practically by simple evaporation, and that the final stage of concentration should be carried out by blowing superheated steam or other vapor carrying medium through the mass in addition to supplying heat. Evaporation of the solvent may be accomplished in a number of stages through which the wax-laden solvent passes by gravity. In each of the stages the wax-laden solvent or extract may be suitably heated. Thus, for example, a major portion may be removed in a first stage, a further portion in a second stage, and a still further in a third stage, with completion of the removal being made through the introduction of steam or other medium to bring about a stripping of the solvent from the wax, which is maintained in a molten condition. The solvent so obtained is condensed and the condensate utilized for further extraction. When the solvent has been removed the wax is permitted to flow into a suitable storage space from which it may be withdrawn, as desired, and cast into suitable forms for commercial purposes. Moreover, the wax produced may be purified or refined.

Furthermore, the evaporation of the solvent from the crude wax may be occasioned at reduced pressure instead of at atmospheric pressure, and the extraction of the cachaza may be conducted at a pressure greater than atmospheric pressure, whereby a higher temperature, with attending greater solubility, will be obtained. While solvents which are lighter than water are particularly described hereinabove, it will be realized that it will be possible to use a solvent which is heavier than water and which would cause the cachaza mix to float thereupon.

The foregoing procedure leads to an effective extraction of wax from cachaza, and the following features attend: treatment of cachaza with solvent may be at a controlled rate as to time of contact and ratio of solvent to dry material; tendency of the cachaza to adhere to surfaces is obviated through the presence of a solvent which is immiscible with water and which preferentially wets the surfaces; adjustment of the water content of the cachaza eliminates difficulties incidental to variation in moisture content, either of fresh cachaza or of that which has been stored; operating with from 60-85% water, preferably 75-80, leads to a ready mixing of cachaza and solvent, and hence to a facile extraction of wax and lessening of the tendency to form an emulsion between the solvent and the water-cachaza mass; heating of the cachaza during admixture thereof with water to the operating temperature reduces the heating required during the extraction stage; removal of the wax-laden solvent following contact with fresh cachaza or that which has the highest wax content and removal of treated cachaza following contact of fresh solvent, or that of low wax content, accords an efficient operating condition; conducting the procedure at the boiling point of the solvent-water-cachaza mix has the advantage that the vapor formed aids in maintaining uniform temperature distribution throughout the mass undergoing extraction, and operation at substantially atmospheric pressure renders the procedure simple and capable of being carired out in less expensive equipment.

Since certain changes may be made in carrying out the above method with departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A method for recovering wax from cachaza, which comprises treating cachaza having a water content from about 60 to about 85% with a water-immiscible organic solvent for said wax, separating wax-laden solvent and treated cachaza, and recovering wax from said separated solvent.

2. A method for recovering wax from cachaza, which comprises adjusting the water content of cachaza to from about 60 to about 85%, then treating with a water-immiscible organic solvent for said wax, separating wax-laden solvent and treated cachaza, and recovering wax from said separated solvent.

3. A method for recovering wax from cachaza, which comprises admixing water with cachaza to give a content of from about 60 to about 85%, then treating with a water-immiscible organic solvent for said wax, separating wax-laden solvent and treated cachaza, and recovering wax from said separated solvent.

4. A method for recovering wax from cachaza, which comprises adjusting the water content of cachaza to from about 75 to about 80%, then treating with a water-immiscible organic solvent for said wax, separating wax-laden solvent and treated cachaza, and recovering wax from said separated solvent.

5. A method for recovering wax from cachaza, which comprises adjusting the water content of cachaza to from about 75 to about 80%, then treating with a water-immiscible organic solvent for said wax at a temperature upwards of 60° F., separating wax-laden solvent and treated cachaza, and recovering wax from said separated solvent.

6. A method for recovering wax from cachaza, which comprises adjusting the water content of cachaza to from about 75 to about 80%, then treating with an aliphatic hydrocarbon solvent for said wax, separating wax-laden solvent and treated cachaza, and recovering wax from said separated solvent.

7. A method for recovering wax from cachaza, which comprises adjusting the water content of cachaza to from about 75 to about 80%, then treating with a liquid hydrocarbon solvent for said wax, separating wax-laden solvent and treated cachaza, and recovering wax from said separated solvent.

8. A method for recovering wax from cachaza, which comprises adjusting the water content of cachaza to from about 75 to about 80%, then treating with a liquid petroleum fraction which is a solvent for said wax, separating wax-laden solvent and treated cachaza, and recovering wax from said separated solvent.

9. A method for recovering wax from cachaza, which comprises treating cachaza having a water content of about 77% with a liquid petroleum fraction which is a solvent for said wax at a temperature upwards of about 60° F., separating wax-laden solvent and treated cachaza, and recovering wax from said separated solvent by distillation.

10. A method for recovering wax from cachaza, which comprises admixing water with cachaza to give a content of about 77%, then treating with a liquid petroleum fraction, distilling completely at about 230° F. at a temperature of about 170° F., separating wax-laden solvent and treated cachaza, and recovering wax from said separated solvent by distillation.

11. A method for recovering wax from cachaza, which comprises treating cachaza having a water content from about 75 to 80% with a liquid petroleum fraction which is a solvent for said wax, separating wax-laden solvent and treated cachaza, recovering wax from said separated solvent by distillation, and recovering solvent from treated and separated cachaza by distillation.

12. A method for recovering wax from cachaza, which comprises treating cachaza having a water content from about 75 to 80% with a liquid petroleum fraction which is a solvent for said wax, separating wax-laden solvent and treated cachaza, recovering wax from said separated solvent by distillation, and recovering solvent from treated and separated cachaza by forming a slurry thereof with water and distilling said slurry.

FRED H. RHODES.
OSCAR J. SWENSON.

REFERENCES CITED

The following references are of record in the file of this patent:

UNITED STATES PATENTS

| Number | Name | Date |
|---|---|---|
| 2,009,522 | Rosales | July 30, 1935 |
| 1,309,999 | Bunker | July 15, 1919 |
| 1,018,589 | Sharp | Feb. 27, 1912 |